May 11, 1926.  R. T. MARINO  1,584,627
MEANS FOR TEACHING READING
Filed May 23, 1925
Fig. 1.   Fig. 2.
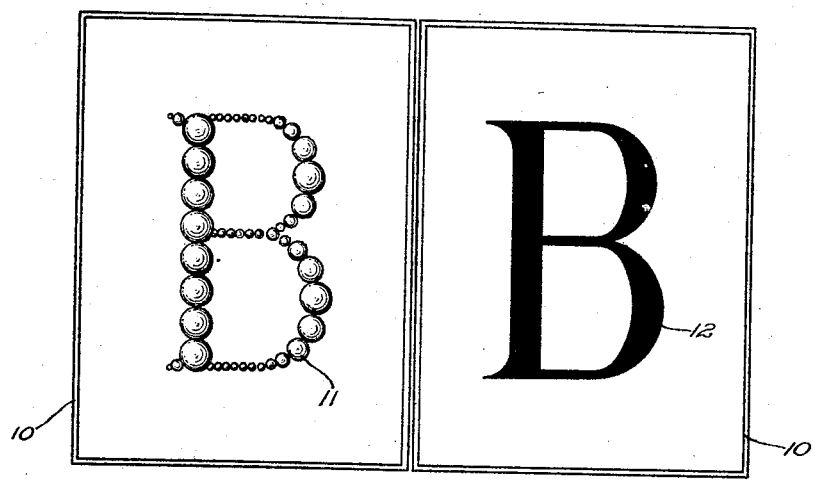
Fig. 3.   Fig. 4.
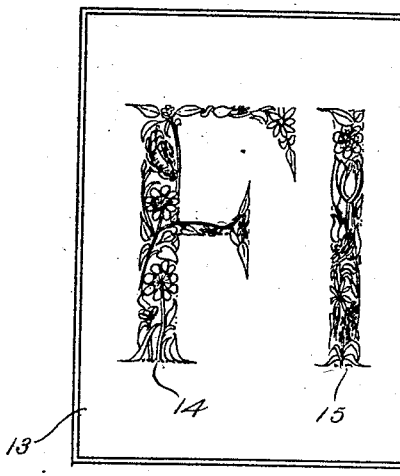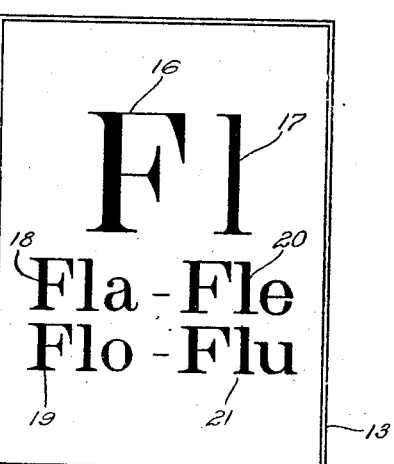
WITNESSES:
E. A. Wilson.
Chris Feinle.
INVENTOR
RAFAEL TORRES MARINO
BY Munn & Co
ATTORNEYS Patented May 11, 1926.

1,584,627

UNITED STATES PATENT OFFICE.

RAFAEL TORRES MARINO, OF BOGOTA, COLOMBIA.

MEANS FOR TEACHING READING.

Application filed May 23, 1925. Serial No. 32,449.

This invention relates to means for teaching elementary reading.

Ordinarily in teaching the sounds designations or names of the letters, there is no association of ideas between the signs of the letters and the sounds, designations or names, respectively, and a great exertion of memory is therefore required to remember the arbitrary sounds, designations or names of the signs which represent the letters of the alphabet. Therefore, the present invention contemplates inculcating the association of the first letter of the name of an object and the graphic representation of the object by which one is identified by the other, or vice versa.

To this end means is provided which primarily consists of graphically or pictorially formed first letter of a name identifying an object and formed of graphic representations of the object. Such means is used in evoking answers from a pupil to questions asked in connection with the graphically formed letter so that the object and the particular letter will be associated in the pupil's mind. This phase of the invention is to be known as "graphic objective representation of letters."

Another phase or innovation of the invention is to graphically represent two consonant letters in order to associate the distinct sounds of the two consonant letters in a syllable and some object.

It is to be understood that the means for carrying out the results looked for has a wide range of application. Therefore, the invention is not to be restricted to the means shown in the accompanying drawing, in which:

Figure 1 is a face view of a chart or plate having thereon a pictorial or graphic formation of one letter of the alphabet, namely, the letter "B", which is formed of graphic or pictorial representation of balls;

Fig. 2 is a view of the obverse face of the chart or plate shown in Fig. 1, which shows the letter "B" printed or formed in the usual manner;

Fig. 3 is a face view of a chart or plate on which is shown pictorial or graphic formations of a plurality of consonant letters which form a part of a prefix or suffix syllable of a word, which consonant letters are formed of graphic representations of flowers, for instance;

Fig. 4 is a view of the obverse face of the chart or plate shown in Fig. 3, which shows the consonant letters which form a part of a syllable of a prefix of a word, also similar consonant letters associated with other letters, respectively, which constitute complete syllables forming a prefix of a word.

Referring now more particularly to Figs. 1 and 2, of the drawings, it will be apparent that the chart 10 on one face thereof, has a graphic formation 11 of a letter; in the present instance the letter "B", the first letter of the name "ball" is used, and this letter "B" is formed of individual graphic representations of the ball. As shown in Fig. 2, the obverse face of the chart or plate 10 has suitably formed thereon, as by printing, the letter "B", as at 12, substantially similar in outline and appearance to the graphically formed letter 11. In teaching elementary reading, the teacher presents to the view of a pupil the graphically formed letter 11 and then the letter in its ordinary form, as the letter 12. If desired, the letter 12 may be printed on a separate chart or plate so that both the graphically formed letter and the ordinary form of letter may be presented to view simultaneously. While the letters are being exhibited, the teacher pronounces the word "Ball" and also the sound or designation of the letter "B", and the pupil is requested to repeat just what was said by the teacher. This exercise is practiced as many times as it may be deemed necessary for the inculcation. After this exercise, the graphically formed letter 11 is exhibited and an answer is evoked by asking the pupil, "What letter is this?" This is followed by the exhibition of the letter 12, in which the question is repeated. During these exercises the teacher frequently makes reference or calls to the attention of the pupil the fact that the word "Ball" begins with the letter "B" to impress upon the mind of the pupil, the particular association which identifies the letter and the name of the object.

Referring now to Figs. 2 and 3, it will be apparent that the chart 13 on one face thereof, has graphically or pictorially formed, a letter 14 in the form of "F" and a letter 15 in the form of "l", each of which letters 14 and 15 is formed of individual graphical representations of flowers, for instance. In this phase of the invention, the idea is to associate a number of letters with the particular sound to instruct in the phonetic character of two consonants as distinguished from the component sounds of the two letters taken individually. In Fig. 4, the chart or plate 13 on the obverse face, has printed thereon in the usual manner, the consonants 16 and 17 corresponding to the letters 14 and 15, and syllables 18, 19, 20 and 21, each of which includes the consonants 16 and 17. In order to teach the pronunciations of associated consonants of a word or name identifying a particular object, the exercises as outlined above are carried out.

What is claimed is:

1. Means for teaching reading, which consists of a chart or plate having displayed thereon, a graphic formation of a letter of the alphabet and formed of a plurality of graphic representations of an object, the letter being the first letter of a name which identifies the particular object.

2. Means for teaching reading, which consists of a chart or plate having displayed on one face thereof a pictorial representation related to a name of an object and a representation of the same character as the first mentioned representation distinctly formed.

3. Means for teaching reading, which consists of a chart or plate having displayed thereon graphic formations of letters of the alphabet and each formed of a plurality of graphic representations of an object, the letters constituting consonants of a syllable of a name which identifies the particular object.

RAFAEL TORRES MARINO.